United States Patent
Hamanaka et al.

(10) Patent No.: US 7,122,237 B2
(45) Date of Patent: Oct. 17, 2006

(54) HONEYCOMB FILTER AND METHOD FOR MANUFACTURING THE SAME

(75) Inventors: Toshiyuki Hamanaka, Suzuka (JP); Yasushi Noguchi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 141 days.

(21) Appl. No.: 10/415,289

(22) PCT Filed: Oct. 3, 2001

(86) PCT No.: PCT/JP01/08719

§ 371 (c)(1),
(2), (4) Date: Apr. 28, 2003

(87) PCT Pub. No.: WO02/41971

PCT Pub. Date: May 30, 2002

(65) Prior Publication Data

US 2004/0053005 A1    Mar. 18, 2004

(30) Foreign Application Priority Data

Nov. 24, 2000  (JP) .............................. 2000-357307

(51) Int. Cl.
*B32B 3/10* (2006.01)
*B32B 5/16* (2006.01)
*B01D 24/00* (2006.01)

(52) U.S. Cl. ...................... 428/131; 428/116; 428/117; 428/119; 428/188; 428/690; 428/913; 428/327; 55/523

(58) Field of Classification Search ................ 428/131, 428/327, 116, 117, 119, 118, 690, 913; 55/523
See application file for complete search history.

(56) References Cited

U.S. PATENT DOCUMENTS

| | | | | |
|---|---|---|---|---|
| 4,364,760 A | * | 12/1982 | Higuchi et al. | ................ 55/523 |
| 4,464,185 A | | 8/1984 | Tomita et al. | |
| 4,568,402 A | * | 2/1986 | Ogawa et al. | ........... 156/89.22 |
| 5,914,187 A | * | 6/1999 | Naruse et al. | .............. 428/327 |

FOREIGN PATENT DOCUMENTS

| | | | |
|---|---|---|---|
| JP | A 55-114324 | | 9/1980 |
| JP | A 57-147145 | | 9/1982 |
| JP | B2 2-53083 | | 11/1990 |
| JP | 5277315 | * | 10/1993 |
| JP | A 5-277314 | | 10/1993 |
| JP | A 5-277315 | | 10/1993 |
| JP | A 9-155131 | | 6/1997 |

* cited by examiner

*Primary Examiner*—Harold Pyon
*Assistant Examiner*—Patricia L. Nordmeyer
(74) *Attorney, Agent, or Firm*—Oliff & Berridge, PLC (57) ABSTRACT

A honeycomb filter includes a honeycomb-shaped filter base having a plurality of through holes and a sealing member fixed on end surfaces of the filter base in which the through holes are open. The through holes of the filter base are clogged with the sealing member in a checker flag form on each end surface so as to clog the through holes differently from the through holes sealed on the opposite end surface. The sealing member is a sheet-shaped fired body with a thickness of 3 mm or less, and a difference in coefficient of thermal expansion at temperatures of 40 to 800° C. between said sealing member and said filter base is $0.5 \times 10^{-6}$/° C. or less. This honeycomb filter has high filtration efficiency, and very high thermal shock resistance and has high bonding strength between the sealing member and the filter base and a low pressure loss.

10 Claims, 2 Drawing Sheets

HONEYCOMB FILTER AND METHOD FOR MANUFACTURING THE SAME

TECHNICAL FIELD

The present invention relates to a honeycomb filter and a method for manufacturing the same. More particularly, it relates to a honeycomb filter that has high filtration efficiency and very high thermal shock resistance, and also has high bonding strength between a sealing member and a filter base and a low pressure loss, and a method for manufacturing the same.

BACKGROUND ART

In recent years, as an environmental problem has become a matter of great concern, a honeycomb filter for removing fine particles (particulates) in exhaust gas of a diesel engine or the like has attracted attention.

Figure 4A:
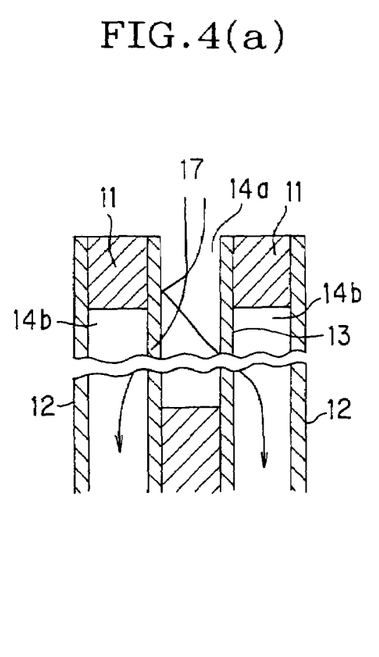
FIGS. 4(a) and 4(b) are views schematically showing one example of a conventional honeycomb filter, FIG. 4(a) being a partially sectional view, and FIG. 4(b) being a plan view.
Figure 4B:
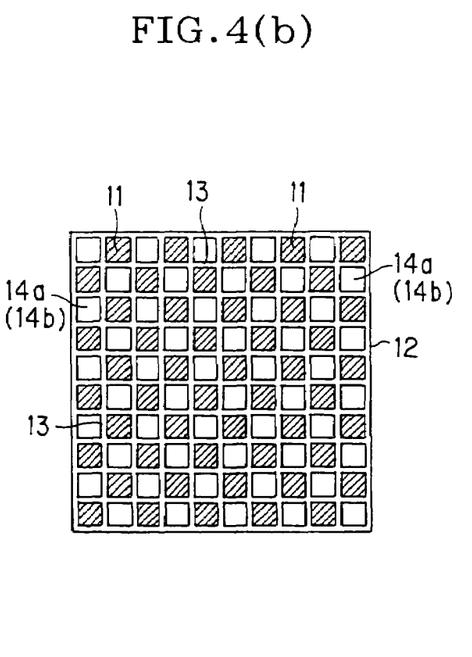

As shown in FIGS. 4(a) and 4(b), the honeycomb filter has a main construction such that through holes 14a and 14b opening on both end surfaces of a honeycomb-shaped filter base 12 formed of porous ceramics are clogged in a checker flag form on one end surface, and the through holes 14b different from the through holes 14a being clogged on one end surface are clogged on the other end surface in a checker flag form. Exhaust gas 17 introduced from either one of end surfaces is forcedly caused to pass through a partition wall 13 between the through holes, by which fine particles (particulates) in the exhaust gas 17 are collected and removed.

Conventionally, there has been widely used a honeycomb filter in which ceramic slurry is pressed into the through holes 14 in the filter base 12 formed of porous ceramics and thereafter is fired, by which a filler material 11 is embedded in the through holes 14 in the filter base 12. In this case, the filler material 11 is not fixed to the partition wall 13 between the through holes by melting-reaction, but slurry is caused to intrude into pores in the partition wall 13 by pressing and is fired, and resultantly the filler material 11 is fixed by, so to say, a mechanism of fitting.

In the conventional honeycomb filter, however, a difference in coefficient of thermal expansion between the filler material 11 and the filter base 12 is not especially considered. Therefore, there arises a problem in that when the coefficient of thermal expansion of the filler material 11 is higher than that of the filter base 12, the filler material 11 intruding into the pore in the partition wall 13 produces cracks on the partition wall 13 due to thermal expansion, and when the coefficient of thermal expansion of the filler material 11 is lower than that of the filter base 12, the filler material 11 comes off.

To solve this problem, there has been proposed a honeycomb filter in which by a specific combination of ceramic materials of the filter base 12 and the filler material 11, the difference in coefficient of thermal expansion between them at temperatures of 40 to 800° C. is made $3.5 \times 10^{-6}/°C$. or less (JP-B-2-53083).

In this honeycomb filter, however, a part of the partition wall 13 of the filter base 12 is covered by the filler material 11 because of its construction, so that the exhaust gas 17 cannot pass through the portion covered by the filler material 11, which presents a problem of decreased filter function.

Also, conventionally, in order to prevent the filler material 11 from coming off by increasing the fixing area between the filter base 12 and the filler material 11, the filler material 11 has been embedded in the through hole 14 in a thickness of about 10 to 15 mm, which presents a problem in that the pressure loss is high and hence the engine output decreases.

Figure 5:
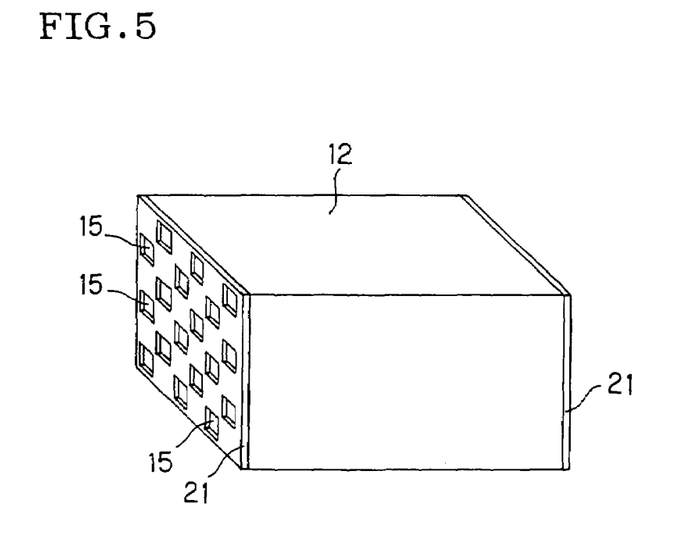
FIG. 5 is a perspective view schematically showing another example of a conventional honeycomb filter.

To solve these problems, there has been proposed a honeycomb filter in which, as shown in FIG. 5, sealing plates 21, in which the through holes 15 in the filter base 12 are clogged in a checker flag form on one end surface, and through holes different from the through holes being clogged on said one end surface are clogged in a checker flag form on the other end surface, are fixed on both end surfaces of the filter body 12 (JP-A-55-114324).

In this honeycomb filter, because the sealing plate 21 is fixed on the end surface of the filter base 12, a part of the partition wall of the filter base 12 is not covered by the sealing plate 21, so that the filter function can be increased, and also cracks can be prevented from being produced on the partition wall.

However, in this honeycomb filter, since a difference in coefficient of thermal expansion due to the difference between ceramic materials of the sealing plate 21 and the filter base 12 is not considered at all, there arises, in practical use, a problem of thermal shock resistance, such that exhaust gas leaks due to separation or coming-off of the sealing plate 21.

Also, in the case of this honeycomb filter, since a thickness of the sealing plate 21 is not considered at all, the ceramic crystals are not oriented sufficiently, depending on the thickness of the sealing plate 21 when the sealing plate 21 in which ceramic crystals are oriented by extrusion molding is formed. As a consequence, in fact, since the difference in coefficient of thermal expansion between the sealing plate 21 and the filter base 12 increases, in the case of the honeycomb filter in which this sealing plate 21 is fixed to the filter base 12, exhaust gas may leak due to separation or coming-off of the sealing plate 21 during its actual use at a high temperature. Also, the conventional problem of decreased engine output caused by increased pressure loss cannot be solved.

On the other hand, the honeycomb filter has conventionally manufactured by a method in which after slurry consisting of ceramics is pressed into the filter base formed by firing a honeycomb-shaped dried body, or after a sheet-shaped molded body before firing is pressed, firing is performed.

In this conventional manufacturing method, however, the firing process consists of two steps: a step in which the honeycomb-shaped dried body is fired to form the filter base and a step in which after slurry is pressed in or after the sheet-shaped molded body is pressed, firing is performed to form a honeycomb filter. This is a main cause of high cost of honeycomb filter, and is a great hindrance to widespread use of honeycomb filter.

Also, when the sheet-shaped molded body is pressed and fired to form a honeycomb filter, the firing shrinkage differs between the filter base already fired and the sheet-shaped molded body before firing, so that even if the through holes in them are aligned with each other at the time of pressing, a shift may occur after firing.

Further, in the manufacturing method in which firing is performed after the sheet-shaped molded body is pressed on the filter body, the bonding strength between the filter base and the sealing member is not necessarily sufficient.

The present invention has been achieved to solve the above problems, and accordingly a first object thereof is to provide a honeycomb filter which has high filtration efficiency and high thermal shock resistance, and also has high bonding strength between a sealing member and a filter base and a low pressure loss.

Also, a second object of the present invention is to provide a method for manufacturing a honeycomb filter, which can manufacture, at a very low cost and precisely, a honeycomb filter which has high filtration efficiency and high thermal shock resistance, and also has high bonding strength between a sealing member and a filter base and a low pressure loss.

DISCLOSURE OF THE INVENTION

The present inventors have conducted studies earnestly to solve the above problems, and resultantly obtained a knowledge that the above-described first object could be attained by making the sealing member a sheet-shaped fired body with a thickness of 3 mm or less and by making a difference in coefficient of thermal expansion at temperatures of 40 to 800° C. between the sealing member and the filter body a value not higher than a specific value, and also obtained a knowledge that the above-described second object could be attained by pressing a sheet-shaped molded body on a honeycomb-shaped dried body and by firing them integrally, by which the present invention was completed.

That is, according the present invention, there is provided a honeycomb filter comprising a honeycomb-shaped filter base formed with a plurality of through holes, and sealing members fixed on the end surface of the filter base in which the through holes are open; the through holes in the filter base being clogged with one of the sealing members in a checker flag form on one end surface and the through holes different from the through holes being clogged on said one end surface being clogged with the other sealing member in a checker flag form on the other end surface, characterized in that the sealing member is a sheet-shaped fired body with a thickness of 3 mm or smaller, and a difference in coefficient of thermal expansion at temperatures of 40 to 800° C. between the sealing member and the filter base is $0.5 \times 10^{-6}$/° C. or less.

In the honeycomb filter in accordance with the present invention, the filter base and the sealing member are preferably formed of ceramics in which oriented cordierite is a primary crystalline phase.

Also, the sealing member is preferably fixed to the filter base by pressing a plastic sheet-shaped molded body on a honeycomb-shaped dried body and firing them, or the sealing member is preferably fixed to the filter base via a bonding material having a difference in coefficient of thermal expansion at temperatures of 40 to 800° C. between the bonding material and the filter base of $0.5 \times 10^{-6}$/° C. or less.

Also, according to the present invention, there is provided a method for manufacturing a honeycomb filter, characterized in that a ceramic material is extrusion molded to form a sheet-shaped molded body and a honeycomb-shaped molded body; through holes are formed in the sheet-shaped molded body in a checker flag form so as to be aligned with the through holes in a honeycomb-shaped dried body obtained by drying the honeycomb-shaped molded body; the sheet-shaped molded body is pressed on the end surface of the honeycomb-shaped dried body at a position at which the through holes formed in the sheet-shaped molded body are aligned with the through holes in the honeycomb-shaped dried body; and the honeycomb-shaped dried body on which the sheet-shaped molded body has been pressed is fired integrally.

In the method for manufacturing a honeycomb filter in accordance with the present invention, it is preferable to use, as a major starting material, a composition of 0 to 20 mass % of kaolin with an average grain size of 1 to 10 μm, 37 to 40 mass % of talc with an average grain size of 5 to 30 μm, 15 to 45 mass % of aluminum hydroxide with an average grain size of 1 to 10 μm, 0 to 15 mass % of aluminum oxide with an average grain size of 4 to 8 μm, and 10 to 20 mass % of fused silica or quartz with an average grain size of 2 to 100 μm, and it is preferable that the sheet-shaped molded body has a thickness of 3 mm or less.

Also, in the method for manufacturing a honeycomb filter in accordance with the present invention, the formation of through holes in the honeycomb-shaped molded body and the pressing of the sheet-shaped molded body on the end surface of the honeycomb-shaped dried body are preferably accomplished at the same time.

BEST MODE FOR CARRYING OUT THE INVENTION

Embodiments of the present invention will now be described below in detail with reference to the accompanying drawings.

1. Honeycomb Filter

Figure 1A:
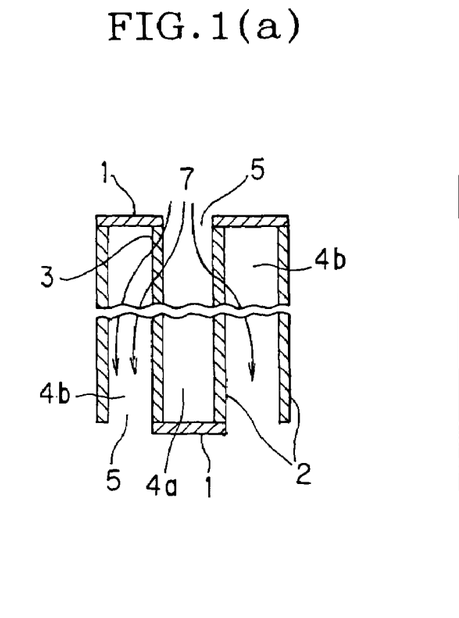
FIGS. 1(a) and 1(b) are views schematically showing one embodiment of a honeycomb filter in accordance with the present invention, FIG. 1(a) being a partially sectional view, and FIG. 1(b) being a plan view.
Figure 1B:
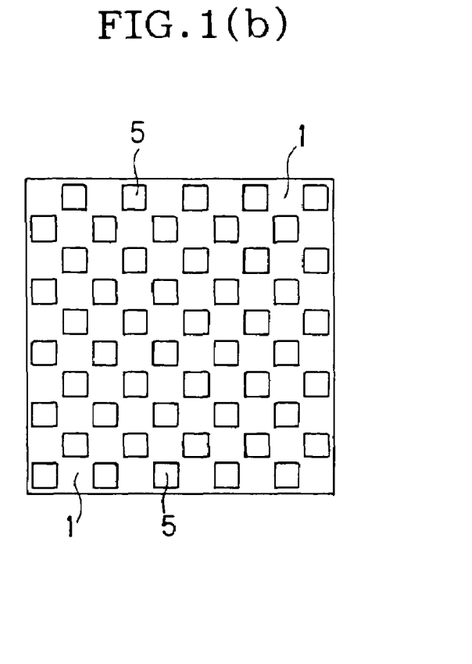

As shown in FIGS. 1(a) and 1(b), a honeycomb filter in accordance with the present invention includes a honeycomb-shaped filter base 2 having a plurality of through holes 4a and 4b and a specific sealing member 1 fixed on an end surface of the filter base 2 in which the through holes 4a and 4b are open.

Thereby, a part of a partition wall 3 of the filter base 2 is not covered by the sealing member 1, and nevertheless the filter function can be increased. Also, the occurrence of cracks on the partition wall 3 of the filter base 2 due to thermal expansion of the sealing member 1 can be prevented.

As a constitution material for the filter base 2 in the present invention, ceramics in which one kind selected from a group consisting of non-oriented cordierite, oriented cordierite, mullite-zircon, mullite, zircon, cordierite-mullite, mullite-aluminum titanate, clay bond silicon carbide, and zirconia-spinel is a primary crystalline phase can be illustrated. Among these, oriented cordierite is preferable in terms of low thermal expansion property.

These ceramics can be used singly or by combining two or more kinds.

Here, the term "oriented cordierite" means cordierite in which a C axis of cordierite crystal is oriented perpendicularly to the flow path direction of exhaust gas.

Concretely, oriented cordierite can be obtained by molding starting material powder by which cordierite is synthesized by means of firing by extrusion molding etc., and by firing the molded product.

The filter base 2 may contain, in addition to the aforementioned materials, for example, indialite, mullite, spinel, sapphirine, corundum, titania or the like.

As a shape of the filter base 2, for example, a circular cylinder whose end face shape is a circle, ellipse, or track circle, a prism whose end face shape is a polygon such as triangle and quadrangle, and a shape such that the side of the circular cylinder or prism is bent into a chevron shape can be illustrated. As the cross-sectional shape of the through hole, for example, a polygon such as quadrangle and octagon, circle, ellipse or the like can be illustrated.

The filter base 2 can be molded, for example, by the extrusion molding method, the injection molding method, the press molding method, or the method in which a ceramic starting material is molded into a cylindrical shape and then through holes are formed. Among these methods, the extrusion molding method is preferable because continuous molding is easy to do and a low thermal expansion property can be achieved by orienting cordierite crystals.

The sealing member 1 in the present invention is used so that the through holes 4a and 4b in the honeycomb-shaped filter base 2 are clogged in a checker flag form on one end surface with the sealing member, and the through holes 4b different from the through holes 4a being clogged on said one end surface are clogged in a checker flag form on the other end surface with the sealing member.

Thereby, exhaust gas 7 introduced from either one of end surfaces is forcedly caused to pass through the partition wall 3 between the through holes, by which fine particles (particulates) in the exhaust gas 7 can be collected and removed.

In the present invention, a difference in coefficient of thermal expansion at temperatures of 40 to 800° C. between the sealing member 1 and the above-described filter base 2 should be $0.5 \times 10^{-6}/°$ C. or less, preferably $0.3 \times 10^{-6}/°$ C. or smaller, and further preferably $0.2 \times 10^{-6}/°$ C. or less.

If the difference in coefficient of thermal expansion at temperatures of 40 to 800° C. exceeds $0.5 \times 10^{-6}/°$ C., when the honeycomb filter is used at a high temperature, a large strain occurs in the fixing portion, so that the sealing member 1 is separated or comes off, by which the exhaust gas 7 leaks and the filter function is lost.

Here, the term "coefficient of thermal expansion" in this description means a rate of dimensional change ($\Delta L/L$) in the direction of gas flow path per unit temperature change (° C.) under a fixed pressure.

As a combination of constitution materials with a difference in coefficient of thermal expansion at temperatures of 40 to 800° C. being $0.5 \times 10^{-6}/°$ C. or less, for example, (1) same constitution materials, (2) mullite-zircon and mullite, (3) cordierite-mullite and non-oriented cordierite or the like can be illustrated. Among these, (1) same constitution materials are preferable because the difference in coefficient of thermal expansion at temperatures of 40 to 800° C. is low, and the bonding strength between the filter base and the sealing member is high, and in particular, it is preferable that both constitution materials are oriented cordierite because of its low thermal expansion property.

The sealing member 1 in the present invention should be a sheet-shaped molded product with a thickness of 3 mm or less, preferably a sheet-shaped molded product with a thickness of 2 mm or less, and further preferably a sheet-shaped molded product with a thickness of 1 mm or less.

If the thickness of the sealing member 1 exceeds 3 mm, the pressure loss of honeycomb filter increases, and hence the engine output decreases. Also, the orientation of ceramic crystals becomes insufficient at the time of extrusion molding, so that the difference in coefficient of thermal expansion between the sealing member 1 and the filter base 2 increases. Therefore, in a honeycomb filter in which such a sealing member is fixed to the filter base 2, exhaust gas leaks due to separation or coming-off of the sealing member 1 when the honeycomb filter is used at a high temperature.

Figure 2:
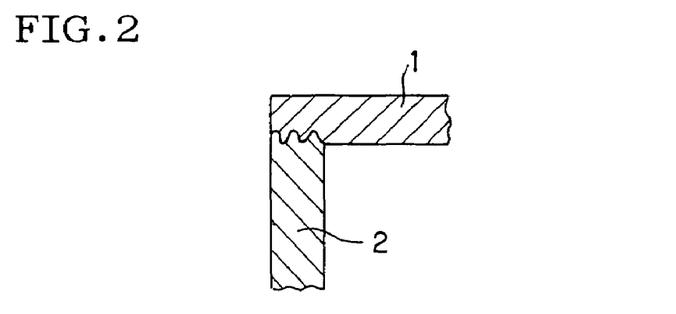
FIG. 2 is a partially sectional view schematically showing an example of a state in which a sealing member is fixed to a filter body in the honeycomb filter in accordance with the present invention.
Figure 3:
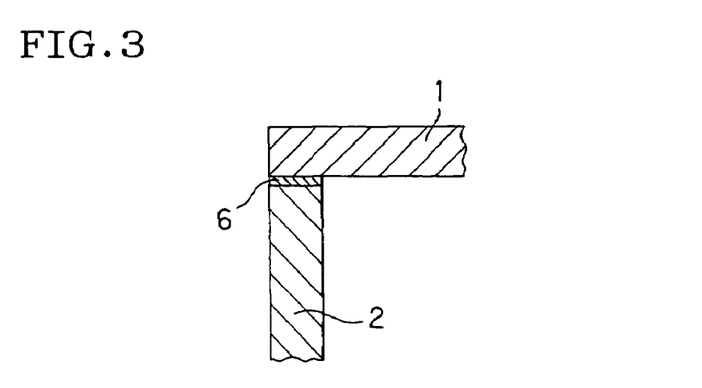
FIG. 3 is a partially sectional view schematically showing another example of a state in which a sealing member is fixed to a filter body in the honeycomb filter in accordance with the present invention.

The sealing member 1 in the present invention may be fixed directly to the filter base 2 as shown in FIG. 2, or may be bonded indirectly via a bonding material 6 as shown in FIG. 3.

As a method of directly fixing the sealing material 1 to the filter base 2 as shown in FIG. 2, for example, one may point out a method in which a sheet-shaped molded body having plasticity is pressed on the end surface of filter base in which through holes are formed, and subsequently fired; and a method in which a sheet-shaped molded body having plasticity is pressed on the end surface of honeycomb-shaped dried body in which through holes are formed, and subsequently fired.

Among these methods, the latter method is preferable because through holes 4 and 5 in the filter base 2 and the sealing member 1 do not shift from each other due to firing, a significant cost reduction can be achieved by the omission of firing step, and the bonding strength between the sealing member 1 and the filter base 2 can be increased.

Here, the term "honeycomb-shaped dried body" means a body obtained by drying a honeycomb-shaped molded body just after it is molded by extrusion molding of a ceramic material. The term "filter base" means a product obtained by firing the honeycomb-shaped dried body. Also, the term "sheet-shaped molded body" means a body obtained by molding a ceramic material by the extrusion molding method or the like, but not being dried and fired.

As a method of indirectly fixing the sealing member 1 to the filter base 2 via the bonding material 6 as shown in FIG. 3, for example, one may point out a method in which slurry consisting mainly of ceramics (which serves as a bonding material after being fired) is applied to the end surface of the filter base 2 or the honeycomb-shaped dried body, and then the sheet-shaped sealing member or the sheet-shaped molded body is pressed and fired.

It is preferable, in the case of the bonding material 6, that the difference in coefficient of thermal expansion at temperatures of 40 to 800° C. between the bonding material 6 and the filter base 2 is of $0.5 \times 10^{-6}/°$ C. or less.

If the difference in coefficient of thermal expansion at temperatures of 40 to 800° C. between the bonding material 6 and the filter base 2 exceeds $0.5 \times 10^{-6}/°$ C., when the honeycomb filter is used at a high temperature, a large strain occurs in the fixing portion, so that the sealing member 1 is separated or comes off, by which exhaust gas may leak.

For the bonding material 6, the coefficient of thermal expansion can be regulated by orienting ceramic crystals by means of extrusion molding etc., but the regulating step is complicated. Therefore, the regulation is preferably carried out by composition of starting materials.

Concretely, for example, when the filter base 2 is formed of oriented cordierite, one may point out an article obtained by firing a ceramic material comprising, as a major starting material, a composition of 0 to 20mass % of kaolin with an average grain size of 2 to 5 μm, 37 to 40 mass % of talc with an average grain size of 8 to 15 μm, 15 to 45 mass % of aluminum hydroxide with an average grain size of 0.5 to 3 μm, 0 to 15 mass % of aluminum oxide with an average grain size of 2 to 4 μm, and 10 to 20 mass % of fused silica or quartz with an average grain size of 2 to 10 μm.

2. Method for Manufacturing Honeycomb Filter

A method for manufacturing a honeycomb filter in accordance with the present invention will be as described below. A ceramic material is extrusion molded to form a sheet-shaped molded body and a honeycomb-shaped molded body. Through holes are formed in a checker flag form in the sheet-shaped molded body so as to be aligned with the through holes in a honeycomb-shaped dried body obtained by drying the honeycomb-shaped molded body. The sheet-shaped molded body is pressed on the end surface of the honeycomb-shaped dried body at a position at which the through holes formed in the sheet-shaped molded body are aligned with the through holes in the honeycomb-shaped dried body, and the honeycomb-shaped dried body on which the sheet-shaped molded body has been pressed is fired integrally. The following will be a detailed description of each step.

In the method for manufacturing a honeycomb filter in accordance with the present invention, a ceramic material is first extrusion molded to form a sheet-shaped molded body and a honeycomb-shaped molded body.

Thereby, starting material grains forming the sheet-shaped molded body and the honeycomb-shaped molded body are oriented, so that the sealing member and the filter base obtained after firing is provided with a low thermal expansion property, and the difference in coefficient of thermal expansion between them can be decreased.

As the ceramic material, one may point out a material containing at least one kind selected from a group consisting of, for example, silicon, titanium, zirconium, silicon carbide, boron carbide, titanium carbide, zirconium carbide, silicon nitride, boron nitride, aluminum nitride, aluminum oxide, zirconium oxide, mullite, cordierite raw material, aluminum titanate, sialon, kaolin, talc, aluminum hydroxide, fused silica, and quartz as a major starting material. As the ceramic material, a material in which these main starting materials are contained singly or by combining two or more kinds.

More concretely, as the major starting material for the honeycomb-shaped molded body, a composition of 0 to 20 mass % of kaolin with an average grain size of 5 to 10 μm, 37 to 40 mass % of talc with an average grain size of 15 to 30 μm, 15 to 45 mass % of aluminum hydroxide with an average grain size of 1 to 10 μm, 0 to 15 mass % of aluminum oxide with an average grain size of 4 to 8 μm, and 10 to 20 mass % of fused silica or quartz with an average grain size of 3 to 100 μm is preferable because the filter base has an excellent low thermal expansion property.

Also, in the case where the major starting material for the honeycomb-shaped molded body is the above-described starting material, it is preferable to use, as a starting material for the sheet-shaped molded body, the one comprising 0 to 20 mass % of kaolin with an average grain size of 2 to 5 μm, 37 to 40 mass % of talc with an average grain size of 8 to 15 μm, 15 to 45 mass % of aluminum hydroxide with an average grain size of 0.5 to 3 μm, 0 to 15 mass % of aluminum oxide with an average grain size of 2 to 4 μm, and 10 to 20 mass % of fused silica or quartz with an average grain size of 2 to 10 μm in that the sealing member has an excellent low thermal expansion property, and the difference in coefficient of thermal expansion between the sealing member and the filter base is small.

The reason why the same starting materials are not used is consideration of the fact that the degree of orientation due to extrusion molding differs.

In the present invention, a desired additive can be added to the ceramic material at need.

As an additive, one may take up a binder, a dispersing agent for promoting dispersion into a medium liquid, a pore forming material for forming pores, or the like.

As a binder, for example, hydroxypropyl methyl cellulose, methyl cellulose, hydroxyethyl cellulose, carboxymethyl cellulose, and polyvinyl alcohol can be illustrated. As a dispersing agent, for example, ethylene glycol, dextrin, fatty-acid soap, and polyalcohol can be illustrated. As a pore forming material, for example, graphite, wheat flour, starch, phenolic resin, and polyethylene terephthalate or the like can be illustrated.

These additives can be used singly or by combining two or more kinds according to the purpose.

Usually, after about 10 to 40 weight part of water is charged to 100 weight part of starting material powder consisting of the above-described major starting material and the additive added at need, the ceramic material is kneaded to form a plastic mixture.

The extrusion molding can be accomplished by using a vacuum earth kneading machine, a ram extrusion molding machine, or the like.

The sheet-shaped molded body formed by extrusion molding should preferably have a thickness of 3 mm or less, further preferably have a thickness of 2 mm or less, and still further preferably have a thickness of 1 mm or less.

If one chooses a thickness of 3 mm or less, the pressure loss of honeycomb filter may be decreased, and hence the engine output may be increased. Also, it orients ceramic crystals sufficiently by means of extrusion molding, and hence can decrease the difference in coefficient of thermal expansion between the sealing member and the filter base.

As the outside shape of the formed honeycomb-shaped molded body, for example, a circular cylinder whose end face shape is a circle or ellipse, a prism whose end face shape is a polygon such as triangle and quadrangle, and a shape such that the side of the circular cylinder or prism is bent into a chevron shape can be illustrated. As the cross-sectional shape of the through hole in the honeycomb-shaped molded body, for example, a polygon such as quadrangle and octagon, circle, ellipse or the like can be illustrated.

In the method for manufacturing a honeycomb filter in accordance with the present invention, next, through holes are formed in the sheet-shaped molded body in a checker flag form so as to be aligned with the through holes in the honeycomb-shaped dried body obtained by drying the honeycomb-shaped molded body.

By forming the through holes in the sheet-shaped molded body so as to be aligned with the through holes in the honeycomb-shaped dried body before firing, the occurrence of shift between the through holes in these bodies caused by firing shrinkage due to firing performed subsequently can be prevented.

A method of drying the honeycomb-shaped molded body is not subject to special restriction, and, for example, hot air drying, microwave drying, dielectric drying, drying under reduced pressure, vacuum drying, or freeze drying can be performed.

As a method of forming the through holes in a checker flag form so as to be aligned with the through holes in the honeycomb-shaped dried body, a method in which after the hole forming positions on the sheet-shaped molded body are aligned with the through holes in the honeycomb-shaped dried body, holes are formed by punching can be illustrated. However, it is preferable that the formation of through holes in the honeycomb-shaped molded body and the later-described pressing of the sheet-shaped molded body on the end surface of the honeycomb-shaped dried body be accomplished at the same time because the through holes 4 and 5 in these bodies can be aligned exactly and the manufacturing procedure for the honeycomb filter can be simplified.

Concretely, for example, a method in which after the sheet-shaped molded body is placed on the end surface of the honeycomb-shaped molded body, a sheet-shaped member, which has a periphery corresponding to the sheet-shaped molded body and also has hole forming means disposed so as to correspond to the through holes in the honeycomb-shaped dried body, is pressed to accomplish the formation of through holes and the pressing at the same time can be illustrated.

In the method for manufacturing a honeycomb filter in accordance with the present invention, next, the sheet-shaped molded body is pressed on the end surface of the honeycomb-shaped shape dried body at a position at which the through holes formed in the sheet-shaped molded body are aligned with the through holes in the honeycomb-shaped dried body.

Thereby, the contact between these bodies is made closer than the case where one is the filter base of fired body. Therefore, the bonding strength between the sealing sheet and the filter base after firing is increased, so that the sealing sheet can be prevented more surely from being separated or coming off.

When the sheet-shaped molded body is pressed on the end surface of the honeycomb-shaped dried body, the sheet-shaped molded body has only to be pressed as it is because the sheet-shaped molded body has plasticity. Alternatively, the pressing method may be such that after slurry consisting mainly of a ceramic material is applied to the honeycomb-shaped dried body, and then the sheet-shaped molded body is pressed on there.

In the method for manufacturing a honeycomb filter in accordance with the present invention, finally, the honeycomb-shaped dried body on which the sheet-shaped molded body has been pressed is fired integrally.

Thereby, the conventional two-stage firing consisting of firing of the honeycomb-shaped dried body and firing of the filter base on which the sheet-shaped molded body has been pressed can be performed by one-stage firing. Therefore, the manufacturing cost can be reduced significantly, and also the honeycomb filter can be manufactured in a very short period of time. Also, after firing, the occurrence of a shift of corresponding holes can be prevented.

The firing temperature should preferably be 1410 to 1440° C. because the sealing sheet is fixed to the filter base more firmly.

Next, the present invention will be described with reference to examples. The present invention is not limited to these examples.

1. EVALUATION METHOD (1) Electric Furnace Spalling Test

Specimens obtained by examples and comparative examples were put in an electric furnace having been heated to a predetermined temperature. After being held for 30 minutes, the specimens were taken out of the furnace into a room of 25° C. and were placed on a fire brick. After the specimens were cooled, the presence of crack was judged by appearance observation and hammering.

The set temperature of the electric furnace started from 650° C., and was raised in 50° C. steps when no crack was found. The highest temperature at which no crack occurs was recorded as the test result.

(2) Pressure Loss Measuring Method

Air of 25° C. was caused to flow to the filter at a rate of 5 $Nm^3$/min, and a pressure difference across the filter was measured.

(3) Coefficient of Thermal Expansion

After the honeycomb-shaped or sheet dried body was fired, a sample was cut out along the direction of gas flow path, and the coefficient of thermal expansion at temperatures of 40 to 800° C. (rate of dimensional change ($\Delta L/L$) in the direction of gas flow path per unit temperature change (° C.) under a fixed pressure) was measured. In the case of slurry, after the slurry was dried and fired, a sample was cut out, and the coefficient of thermal expansion at temperatures of 40 to 800° C. was measured.

2. EXAMPLES AND COMPARATIVE EXAMPLES

Example 1

First, a material in which 30 weight part of water, 30 weight part of pore forming material (graphite), 4 weight part of binder (methyl cellulose), and 0.5 weight part of dispersing agent (potassium laurate) were kneaded with 100 weight part of cordierite raw material of composition 1 shown in Table 1 was extrusion molded and then dried to obtain a honeycomb-shaped dried body (pre-fired one).

Next, a material in which 30 weight part of water, 30 weight part of pore forming material (graphite), 4 weight part of binder (polyethylene terephthalate), and 0.5 weight part of dispersing agent (potassium laurate) were kneaded with 100 weight part of cordierite raw material of composition 2 shown in Table 1 was extrusion molded to obtain a 1.5 mm thick sheet-shaped molded body having plasticity before drying. In this sheet-shaped molded body, portions corresponding to the through holes in the honeycomb-shaped dried body were punched in a checker flag form, and the sheet-shaped molded body was pressed on both end surfaces so that different through holes were clogged alternately on one end surface and the other end surface of the honeycomb dried body on which the through holes were open.

Finally, by firing at 1420° C. after drying in this state, there was obtained a cordierite honeycomb filter (filter base: porosity of 60%, average fine hole diameter of 25 µm, diameter of 144 mm, length of 150 mm, rib thickness of 300 µm, cell density of 300 cells/square $inch^2$, total length of 152 mm) in which a sheet-shaped sealing member (dried and fired sheet-shaped molded body) is fixed to a honeycomb-shaped filter base (fired honeycomb-shaped dried body).

The coefficient of thermal expansion at temperatures of 40 to 800° C. of the obtained honeycomb filter was measured. As a result, it was found that the coefficient of thermal expansion of the filter base was $0.6 \times 10^{-6}$/° C. and that of the sheet-shaped sealing member was $0.8 \times 10^{-6}$/° C. Also, in the electric furnace spalling test, the occurrence of cracks was not found up to 800° C., and the pressure loss was as low as 133 $mmH_2O$. The evaluation results are summarized in Table 2.

Example 2

A cordierite honeycomb filter was obtained in the same way as that in example 1 except that the length of filter base was made 147 mm and the thickness of sheet-shaped molded body was made 2 mm in example 1.

The coefficient of thermal expansion at temperatures of 40 to 800° C. of the obtained honeycomb filter was measured. As a result, it was found that the coefficient of thermal expansion of the filter base was $0.6 \times 10^{-6}/°$ C. and that of the sheet-shaped sealing member was $0.9 \times 10^{-6}/°$ C. Also, in the electric furnace spalling test, the occurrence of cracks was not found up to 800° C., and the pressure loss was as low as 137 mmH$_2$O. The composition used is shown in Table 1, and the evaluation results are summarized in Table 2.

Example 3

A cordierite honeycomb filter was obtained in the same way as that in example 1 except that the length of filter base was made 149 mm and the thickness of sheet-shaped molded body was made 3 mm in example 1.

The coefficient of thermal expansion at temperatures of 40 to 800° C. of the obtained honeycomb filter was measured. As a result, it was found that the coefficient of thermal expansion of the filter base was $0.6 \times 10^{-6}/°$ C. and that of the sheet-shaped sealing member was $1.1 \times 10^{-6}/°$ C. Also, in the electric furnace spalling test, the occurrence of cracks was not found up to 750° C., and the pressure loss was as low as 140 mmH$_2$O. The composition used is shown in Table 1, and the evaluation results are summarized in Table 2.

Example 4

A cordierite honeycomb filter was obtained in the same way as that in example 1 except that slurry was prepared by using a cordierite raw material of composition 3 shown in Table 1, the slurry was applied to both end surfaces of filter base in which the through holes were open, and the sheet-shaped molded body was pressed on there in example 1.

The coefficient of thermal expansion at temperatures of 40 to 800° C. of the obtained honeycomb filter was measured. As a result, it was found that the coefficient of thermal expansion of the filter base was $0.6 \times 10^{-6}/°$ C., that of the sheet-shaped sealing member was $0.8 \times 10^{-6}/°$ C., and that of the bonding material (sintered body after slurry firing) was $1.1 \times 10^{-6}/°$ C. Also, in the electric furnace spalling test, the occurrence of cracks was not found up to 800° C., and the pressure loss was as low as 135 mmH$_2$O. The composition used is shown in Table 1, and the evaluation results are summarized in Table 2.

Comparative Example 1

A cordierite honeycomb filter was obtained in the same way as that in example 1 except that the length of filter base was made 145 mm and the thickness of sheet-shaped molded body was made 4 mm in example 1.

The coefficient of thermal expansion at temperatures of 40 to 800° C. of the obtained honeycomb filter was measured. As a result, it was found that the coefficient of thermal expansion of the filter base was $0.6 \times 10^{-6}/°$ C. and that of the sheet-shaped sealing member was $1.3 \times 10^{-6}/°$ C. Also, in the electric furnace spalling test, if the temperature exceeds 700° C., the occurrence of cracks was found, and the pressure loss was as high as 144 mmH$_2$O. The composition used is shown in Table 1, and the evaluation results are summarized in Table 2.

Comparative Example 2

A cordierite honeycomb filter was obtained in the same way as that in example 1 except that slurry was prepared by using a cordierite raw material of composition 1 shown in Table 1, the slurry was applied to both end surfaces of filter base in which the through holes were open, and the sheet-shaped molded body was pressed on there in example 1. The coefficient of thermal expansion at temperatures of 40 to 800° C. of the obtained honeycomb filter was measured. As a result, it was found that the coefficient of thermal expansion of the filter base was $0.6 \times 10^{-6}/°$ C., that of the sheet-shaped sealing member was $0.8 \times 10^{-6}/°$ C., and that of the bonding material (sintered body after slurry firing) was $1.5 \times 10^{-6}/°$ C. Also, although the pressure loss was as low as 137 mmH$_2$O, in the electric furnace spalling test, if the temperature exceeds 700° C., the occurrence of cracks was found. The composition used is shown in Table 1, and the evaluation results are summarized in Table 2.

Comparative Examples 3 and 4

A cordierite honeycomb filter was obtained in the same way as that in example 1 except that slurry was prepared by using a cordierite raw material of composition 1 shown in Table 1, and the slurry was pressed in and embedded in the through holes in the filter base in a depth of 5 mm and 10 mm in Example 1.

For the obtained honeycomb filter, the measurement of coefficient of thermal expansion at temperatures of 40 to 800° C. and pressure loss and the electric furnace spalling test were carried out. The results were as described below. For comparative example 3, the coefficient of thermal expansion at temperatures of 40 to 800° C. was $0.6 \times 10^{-6}/°$ C. for the filter base and $1.5 \times 10^{-6}/°$ C. for the sealing member (slurry had been dried and fired). Also, in the electric furnace spalling test, if the temperature exceeds 700° C., the occurrence of cracks was found, and the pressure loss was as high as 150 mmH$_2$O. Also, for comparative example 4, the coefficient of thermal expansion at temperatures of 40 to 800° C. was $0.6 \times 10^{-6}/°$ C. for the filter base and $1.5 \times 10^{-6}/°$ C. for the sealing member (slurry had been dried and fired). Also, in the electric furnace spalling test, if the temperature exceeds 650° C., the occurrence of cracks was found, and the pressure loss was further high, being 172 mmH$_2$O. The composition used is shown in Table 1, and the evaluation results are summarized in Table 2.

TABLE 1

| Name of starting material | Composition 1 | | Composition 2 | | Composition 3 | |
| --- | --- | --- | --- | --- | --- | --- |
| | Mass % | Average grain size | Mass % | Average grain size | Mass % | Average grain size |
| Talc | 40% | 20 μm | 38% | 10 μm | 38% | 7 μm |
| Kaolin | 20% | 10 μm | 19% | 2 μm | 19% | 1.3 μm |
| Quartz | 11% | 10 μm | — | — | — | — |
| Fused silica | — | — | 10% | 4 μm | 10% | 2.5 μm |
| Alumina | 14% | 7 μm | — | — | — | — |
| Aluminum hydroxide | 15% | 5 μm | 33% | 2 μm | 33% | 1.0 μm |

TABLE 2

Test results

|  | Example 1 | Example 2 | Example 3 | Example 4 | Comparative example 1 | Comparative example 2 | Comparative example 3 | Comparative example 4 |
|---|---|---|---|---|---|---|---|---|
| Coefficient of thermal expansion at 40 to 800° C. of filter base ($10^{-6}$/° C.) | 0.6 | 0.6 | 0.6 | 0.6 | 0.6 | 0.6 | 0.6 | 0.6 |
| Coefficient of thermal expansion at 40 to 800° C. of sealing member ($10^{-6}$/° C.) | 0.8 | 0.9 | 1.1 | 0.8 | 1.3 | 0.8 | 1.5 | 1.5 |
| Thickness of sealing member (mm) | 1.5 | 2 | 3 | 1.5 | 4 | 1.5 | 5 | 10 |
| Coefficient of thermal expansion at 40 to 800° C. of bonding material ($10^{-6}$/° C.) | — | — | — | 1.1 | — | 1.5 | — | — |
| Electric furnace spalling test (° C.) | 800 | 800 | 750 | 800 | 700 | 700 | 700 | 650 |
| Pressure loss (mmH$_2$O) | 133 | 137 | 140 | 135 | 144 | 137 | 150 | 172 |

3. EVALUATION

In examples 1 to 4 in which the difference in coefficient of thermal expansion at temperatures of 40 to 800° C. between the filter base and the sealing sheet and bonding material was 0.5×10$^{-6}$/° C. or less and the thickness of the sheet-shaped sealing member was 3 mm or less, it was found that the thermal shock resistance was high so that the lowest temperature for crack occurrence was 750° C. or higher in the electric furnace spalling test, and also it was found that the pressure loss was as low as 140 mmH$_2$O or less.

On the other hand, in the honeycomb filter of comparative example 1 in which the thickness of the sheet-shaped sealing member was 4 mm, the coefficient of thermal expansion at temperatures of 40 to 800° C. between the filter base and the sealing sheet was as large as 0.7×10$^{-6}$/° C., and it was found that the thermal shock resistance was low so that the lowest temperature for crack occurrence was 700° C. in the electric furnace spalling test, and also it was found that the pressure loss was as high as 144 mmH$_2$O.

Also, in the honeycomb filter of comparative example 2 in which the coefficient of thermal expansion at temperatures of 40 to 800° C. of the bonding material (slurry had been dried and fired) was as high as 1.5×10$^{-6}$/° C., and the difference in coefficient of thermal expansion at temperatures of 40 to 800° C. between the filter base and the bonding material was as large as 0.9×10$^{-6}$/° C., although the pressure loss was as low as 137 mmH$_2$O, it was found that the thermal shock resistance was low so that the lowest temperature for crack occurrence was 700° C. in the electric furnace spalling test.

Further, in the honeycomb filter of comparative example 3 in which the sealing member (slurry had been dried and fired) having a high coefficient of thermal expansion at temperatures of 40 to 800° C. of 1.5×10$^{-6}$/° C. and a difference in coefficient of thermal expansion at temperatures of 40 to 800° C. between the filter base and the sealing member of 0.9×10$^{-6}$/° C. was embedded in the through holes in filter base in a depth of 5 mm, it was found that the thermal shock resistance was low so that the lowest temperature for crack occurrence was 700° C. in the electric furnace spalling test, and also it was found that the pressure loss was as high as 150 mmH$_2$O. Also, in the honeycomb filter of comparative example 4 in which the sealing member having the same coefficient of thermal expansion at temperatures of 40 to 800° C. was embedded in the through holes in filter base in a depth of 10 mm, it was found that the thermal shock resistance was low so that the lowest temperature for crack occurrence was 650° C. in the electric furnace spalling test, and also it was found that the pressure loss was further high, being 172 mmH$_2$O.

INDUSTRIAL APPLICABILITY

As described above, according to the honeycomb filter in accordance with the present invention, there can be provided a honeycomb filter which has high filtration efficiency and high thermal shock resistance, and also has high bonding strength between a sealing member and a filter base and a low pressure loss.

Also, according to the method for manufacturing a honeycomb filter in accordance with the present invention, there can be provided a method for manufacturing a honeycomb filter, which can manufacture, at a very low cost and precisely, a honeycomb filter which has high filtration efficiency and high thermal shock resistance, and also has high bonding strength between a sealing member and a filter base and a low pressure loss.

The invention claimed is:

1. A honeycomb filter having a honeycomb-shaped filter base formed with a plurality of through holes and a sealing member fixed on an end surface of said filter base in which said through holes are open, in which said through holes of said filter base are clogged with said sealing member in a checker flag form on one end surface, and are clogged with the sealing member in a checker flag form on the other end surface so as to clog the through holes different from the through holes sealed on said one end surface, wherein said sealing member is a sheet-shaped fired body with a thickness of 3 mm or less, and a difference in coefficient of thermal expansion at temperatures of 40 to 800° C. between said sealing member and said filter base is 0.5×10$^{-6}$/° C. or less.

2. The honeycomb filter according to claim 1, wherein said filter base and said sealing member are formed of ceramics in which oriented cordierite is a primary crystalline phase.

3. The honeycomb filter according to claim 1, wherein said sealing member is fixed to said filter base by pressing a plastic sheet-shaped molded body on a honeycomb-shaped dried body and firing them.

4. The honeycomb filter according to claim 2, wherein said sealing member is fixed to said filter base by pressing a plastic sheet-shaped molded body on a honeycomb-shaped dried body and firing them.

5. The honeycomb filter according to claim 1, wherein said sealing member is fixed to said filter base via a bonding material having a difference in coefficient of thermal expansion at temperatures of 40 to 800° C. between said bonding material and said filter base of $0.5 \times 10^{-6}/°$ C. or less.

6. The honeycomb filter according to claim 2, wherein said sealing member is fixed to said filter base via a bonding material having a difference in coefficient of thermal expansion at temperatures of 40 to 800° C. between said bonding material and said filter base of $0.5 \times 10^{-6}/°$ C. or less.

7. A method for manufacturing a honeycomb filter, comprising the steps of:

extruding and molding a ceramic material to form a sheet-shaped molded body and a honeycomb-shaped molded body;

forming through holes in said sheet-shaped molded body in a checker flag form so as to be aligned with the through holes in a honeycomb-shaped dried body obtained by drying said honeycomb-shaped molded body;

pressing said sheet-shaped molded body on an end surface of said honeycomb-shaped dried body at a position at which the through holes formed in said sheet-shaped molded body are aligned with the through holes in said honeycomb-shaped dried body; and integrally firing said honeycomb-shaped dried body on which said sheet-shaped molded body has been pressed characterized in that said sealing member is a sheet-shaped fired body with a thickness of 3 mm or less, and a difference in coefficient of thermal expansion at temperatures of 40 to 800° C. between said sealing member and said filter base is 0.5 $10-6/°$ C. or less.

8. The method for manufacturing a honeycomb filter according to claim 7, wherein a major starting material for said ceramic material is a material comprising a composition of 0 to 20 mass % of kaolin with an average grain size of 1 to 10 μm, 37 to 40 mass % of talc with an average grain size of 5 to 30 μm, 15 to 45 mass % of aluminum hydroxide with an average grain size of 1 to 10 μm, 0 to 15 mass % of aluminum oxide with an average grain size of 4 to 8 μm, and 10 to 20 mass % of fused silica or quartz with an average grain size of 2 to 100 μm.

9. The method for manufacturing a honeycomb filter according to claim 7, wherein said sheet-shaped molded body has a thickness of 3 mm or less.

10. The method for manufacturing a honeycomb filter according to claim 9, wherein a formation of through holes in said honeycomb-shaped molded body and a pressing of said sheet-shaped molded body on the end surface of said honeycomb-shaped dried body are accomplished at the same time.

* * * * *